US010685773B2

(12) United States Patent
Michalik et al.

(10) Patent No.: US 10,685,773 B2
(45) Date of Patent: Jun. 16, 2020

(54) TRANSFORMER INSULATION

(71) Applicant: ABB SCHWEIZ AG, Baden (CH)

(72) Inventors: Adam Michalik, Bibice (PL); Patricia Ricketts, South Boston, VA (US); Massimo Carmignoto, Montegrotto Terme (IT); Jayram Yadava, Ballia (IN); Roberto Zannol, Montegrotto Terme (IT); Miljenko Hrkac, Monselice (IT); Alessandro Mattozzi, Sundbyberg (SE); Claire Pitois, Sundbyberg (SE); Emmanouil Logakis, Baden-Dättwil (CH); Harald Martini, Västerås (SE); Ilario Scian, Cary, NC (US); Orlando Girlanda, Västerås (SE); Rudi Velthuis, Lauchringen (DE); Spiros Tzavalas, Lengnau (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/652,716

(22) PCT Filed: Dec. 5, 2013

(86) PCT No.: PCT/EP2013/075686
§ 371 (c)(1),
(2) Date: Jun. 16, 2015

(87) PCT Pub. No.: WO2014/095399
PCT Pub. Date: Jun. 26, 2014

(65) Prior Publication Data
US 2015/0332835 A1    Nov. 19, 2015

(30) Foreign Application Priority Data

Dec. 19, 2012    (EP) .................................. 12198124

(51) Int. Cl.
*H01F 27/10*    (2006.01)
*H01F 27/14*    (2006.01)
(Continued)

(52) U.S. Cl.
CPC ......... *H01F 27/14* (2013.01); *B29C 45/0005* (2013.01); *H01B 3/47* (2013.01);
(Continued)

(58) Field of Classification Search
CPC ...................................................... H01B 3/47
(Continued)

(56) References Cited

U.S. PATENT DOCUMENTS 3,240,848 A    3/1966 Burke et al.
3,503,797 A    3/1970 Hagiwara et al.
(Continued)

FOREIGN PATENT DOCUMENTS

BR    112015013602 A2    7/2017
BR    112015013817 A2    7/2017
(Continued)

OTHER PUBLICATIONS

European Search Report Application No. EP 12 19 8124 Completed: May 24, 2015; dated May 3, 2013 6 pages.
(Continued)

*Primary Examiner* — Ronald Hinson
(74) *Attorney, Agent, or Firm* — Sage Patent Group

(57) ABSTRACT

The present invention relates to an electrical transformer comprising an electrical insulator and a winding of an electrical conductor around a core, said insulator being formed of an essentially non-porous composite material comprising a resin matrix and up to 85% by weight of insulating fibres surrounded by the resin matrix, the com-
(Continued)

posite material having a maximum moisture content of less than 0.5% by weight at 23° C. and 50% relative humidity.

20 Claims, 1 Drawing Sheet

(51) Int. Cl.
```
B29C 45/00      (2006.01)
H01F 27/24      (2006.01)
H01F 27/28      (2006.01)
H01F 41/00      (2006.01)
H01B 3/47       (2006.01)
H01F 27/32      (2006.01)
B29K 101/12     (2006.01)
B29K 309/00     (2006.01)
B29K 105/12     (2006.01)
B29L 31/34      (2006.01)
```
(52) U.S. Cl.
CPC ......... *H01F 27/24* (2013.01); *H01F 27/2823* (2013.01); *H01F 27/32* (2013.01); *H01F 41/00* (2013.01); *B29K 2101/12* (2013.01); *B29K 2105/12* (2013.01); *B29K 2309/00* (2013.01); *B29K 2995/0007* (2013.01); *B29L 2031/3412* (2013.01); *Y10T 29/49021* (2015.01)

(58) Field of Classification Search
USPC ..................................... 336/57, 58
See application file for complete search history.

(56) References Cited

U.S. PATENT DOCUMENTS

| 6,980,076 | B1 * | 12/2005 | Rolling | H01B 3/52 |
| | | | | 174/124 R |
| 8,085,120 | B2 * | 12/2011 | Golner | H01F 27/12 |
| | | | | 174/15.1 |
| 2005/0277351 | A1 | 12/2005 | Smith et al. | |

FOREIGN PATENT DOCUMENTS

| BR | 112015013841 A2 | 7/2017 |
| BR | 112015013941 A2 | 7/2017 |
| BR | 112015013600 A2 | 4/2018 |
| CN | 102473509 A | 5/2012 |
| GB | 1141405 A | 1/1969 |
| WO | 2007111889 A1 | 10/2007 |

OTHER PUBLICATIONS

International Preliminary Report on Patentability Application No. PCT/EP2013/075686 dated Jan. 8, 2015 6 pages.
International Search Report and Written Opinion of the International Searching Authority Application No. PCT/EP2013/075686 Completed: Feb. 10, 2014; dated Feb. 18, 2014 13 pages.
Office Action from Brazil with Translation, Application No. BR112015014037-8, dated Jan. 2, 2020, 6 pages.

* cited by examiner

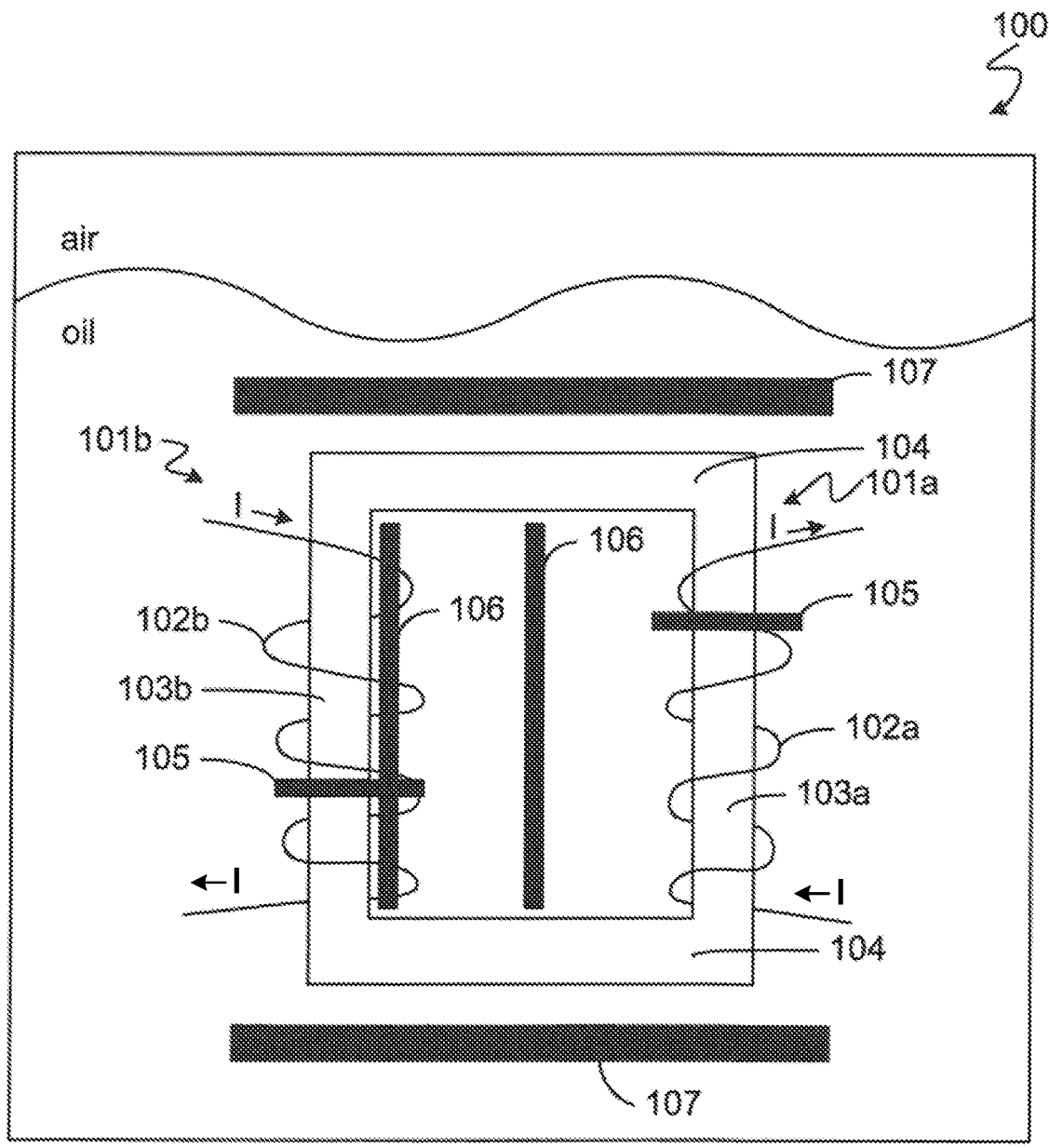

TRANSFORMER INSULATION

TECHNICAL FIELD

The invention relates to an electrical transformer comprising an electrical insulator and a winding of an electrical conductor around a core.

BACKGROUND

In different parts of electrical transformers, insulating material is used to avoid flash-overs and such. This insulating material is typically cellulose based since such a paper or pressboard material is cheap and easy to handle while giving adequate insulation. Examples of insulators in an oil filled transformer are:

Spacers, positioned between the turns/discs of a winding, allowing oil to circulate there between.
axial sticks, positioned between the winding and the core, or between different windings.
cylinders positioned around a winding, between the a winding and its core, or between different windings.
winding tables, positioned atop and below the plurality of windings, supporting the same.
insulation coating of the conductor of the windings.

However, cellulose typically has a moisture content of about 6-8% by weight. Although insulation materials are dried during transformer manufacturing, it is well known that moisture which is present in cellulose insulation continues to be a major cause of problems (dielectric, thermal, ageing, bubble formation and unreliability in operation) during operational life of transformer. The shrinkage of spacers due to moisture may result in axial imbalance of windings if not balanced perfectly which will lead to higher short circuit forces.

Further, cellulose cannot withstand high operating temperatures of the transformer above 105° C. over long time. It would be desirable to be able to operate a transformer continuously at high temperature or to be able to withstand overloads, but then the cellulose based insulators now used are not suitable. Meta-aramid e.g. Nomex™ is an insulating material with higher heat resistance than cellulose, but it is also porous and contains a high amount of moisture.

The high moisture uptake sensitivity to high temperatures of cellulose results in more rapid ageing of the insulating cellulose material. For instance, thermal deterioration of paper is directly proportional to its water content, for each 6-8° C. rise in temperature, the life of paper insulation is halved.

In order to be durable and withstand the strain put on it, especially in oil at high temperatures over long periods of time, the insulating material also needs to be strong and resilient.

U.S. Pat. No. 8,085,120 discloses an insulation system for a fluid-filled power transformer that allows for operation of the transformer at higher temperatures and with lowered susceptibility to aging. The insulation system includes a plurality of fibres that are bound together by a solid binding agent. The solid binding agent may, for example, form sheaths around the fibres or may be in the form of dispersed particles that bind the fibres to each other. A pair of base fibres each has a sheet of binder material which are bound to each other, binding the two base fibres to each other. The fibres form a porous insulating lattice which allows the cooling fluid of the transformer to penetrate and circulate through the insulating material, thereby avoiding bubbles where partial discharges may occur.

WO 2004/072994 discloses a transformer which includes a core defining a core window, a first coil surrounding a portion of the core and including a portion located within the core window, a second coil surrounding a portion of the core and including a portion located within the core window, and a polymer barrier insulation member that is located at least partially within the core window and positioned between the first coil and the second coil. The insulation material is made of a high temperature polymer configured to withstand an operating temperature of approximately 130° C. Further, the polymer material is configured so as to absorb no more than approximately 1% moisture.

SUMMARY

It is an objective of the present invention to solve a problem with the insulating material of the prior art.

According to an aspect of the present invention there is provided an electrical transformer comprising an electrical insulator and a winding of an electrical conductor around a core, said insulator being formed of an essentially non-porous composite material comprising a resin matrix and up to 85% by weight of insulating fibres surrounded by the resin matrix, the composite material having a maximum moisture content of less than 0.5% by weight at 23° C. and 50% relative humidity.

According to another aspect of the present invention, there is provided a method of producing an electrical insulator for an electrical transformer, the method comprising mixing a resin with up to 85% by weight of insulating fibres. The method also comprises processing the mixture with the resin in liquid form into a suitable shape for the electrical insulator. The method also comprises allowing the shaped mixture to cool down and solidify to form the electrical insulator of an essentially non-porous composite material comprising a resin matrix and up to 85% by weight of the insulating fibres surrounded by the resin matrix, the composite material having a maximum moisture content of less than 0.5% by weight at 23° C. and 50% relative humidity. The method may also, in some embodiments, comprise positioning the electrical insulator in an electrical transformer.

That the composite material is essentially non-porous implies that the material does not allow a liquid to penetrate into or through the material via e.g. holes, channels, cracks or the like, nor are there any pores (i.e. closed bubbles formed during production of the composite material, which may alternatively be called voids), at least no pores having a diameter so large that there is a risk of partial discharges in any such pores. Any pores in the composite material are thus too small to allow breakdown in accordance with Paschen's law. The maximum pore diameter for avoiding partial discharges depends e.g. on the voltage etc. In some embodiments pores are acceptable provided that they have a pore diameter of at most 1 micrometre. Also, e.g. by virtue of being essentially non-porous, the material does not take up moisture, as defined by the composite material having a maximum moisture content of less than 0.5% by weight at 23° C. and 50% relative humidity. Thus, the material does not swell/shrink and vary its thickness. Further, the insulator material is a composite material comprising a resin matrix and up to 60% by weight of insulating fibres. The fibres reinforce the insulator material, making it stronger and more resilient to forces and strain put on it. The fibres are surrounded by or immersed in the resin matrix which fixes the fibres in relation to each other, forming a solid, non-porous and impermeable composite material e.g. in the form of a solid block, cylinder or sheet. The low moisture uptake and the absence of pores reduces the compressibility of the insulator, making it suitable for e.g. spacers.

The resin matrix is made from a resin which is heat resistant and has a low moisture uptake. Examples of such resins include a synthetic thermoplastic compound chosen from the group consisting of polyethylene terephthalate (PET), polyphenylene sulphide (PPS), polyetherimide (PEI), polyethylene naphtalate (PEN), polybutylene terephthalate (PBT), polyphenylene ether (PPE) and polyethersulphone (PES), Polyether ether ketone (PEEK) and thermoset resins of epoxy or unsaturated polyester, and any mixture thereof.

The insulator material can comprise up to 85 wt % of fibres, which may still allow the composite mixture of resin and fibres to be e.g. injection moulded to form the insulator. However, in some embodiments, insulator comprises up to 60% or up to 20% by weight of the insulating fibres, which may give sufficient armament and improved mechanical performance. The suitable amount of fibres depend on the mechanical properties desired of the composite material. For instance, a spacer may need higher degree of flexibility whereby a lower proportion of fibres may be used, e.g. between 10 and 30 wt %, while a winding table may require a higher structural strength why a proportion of fibres between 50 and 70 wt % may be suitable. In some applications, the proportion of fibres may be as low as 1 wt % or 10 wt %.

The fibres are preferably also be heat resistant and does not take up moisture, and not be conductive. Examples of suitable fibres comprise glass fibres, basalt fibres or aramid fibres, or any mixture thereof. To avoid the risk of liquid uptake in the interface between the fibre material and the resin matrix at a surface of the insulator, the insulator can e.g. be coated with a resin, e.g. the same resin material as in the resin matrix, such that there are no fibre ends in contact with the exterior of the insulator.

It may be convenient to use relatively long fibres in order to improve the reinforcing effect, improving the strength of the insulator material, but it may also be convenient to use relatively short fibres to improve the workability of the composite mixture, e.g. for injection moulding or other production technique. Also relatively short fibres reinforce and improve the strength and rigidness of the insulator. Thus, in some embodiments, the fibres have a number average length of less than 3 millimetres, such as less than 1 mm or less than 0.2 mm. Alternatively, in some embodiments, the fibres have a number average length of at least 1 mm or even substantially endless fibres.

The electrical conductor can e.g. be an electrically conducting wire, thread or strip.

In some embodiments, the insulator is in the form of at least one of a spacer between turns or discs of the winding, an axial stick outside or inside of the winding e.g. between the winding and the core or between windings, a cylinder around a winding, between a winding and its core or between windings, a winding table positioned atop of or below the coil winding and a conductor insulation adhered to and surrounding the conductor of the winding coil. These are examples of insulators in a transformer where the composite material of the present disclosure can be beneficially used.

In some embodiments, the electrical transformer is configured for an operating temperature of at least 105° C., at least 130° C. or at least 155° C. As defined in IEC 60076-14 (Table 4), the transformer uses high temperature class materials and therefore can be designed with Hybrid insulation system or Semi Hybrid insulation system or mixed insulation system or conventional insulation system. Therefore the insulator of the present invention can e.g. be in temperature class of solid insulating materials starting from 105° C. (Class A), to/from 130° C. (class B) or to/from 155 C (class F).

As discussed above, the electrical transformer may be fluid-filled, for improved insulation and/or heat exchange. The fluid may e.g. be mineral oil, silicon oil, synthetic ester, natural ester or a gas. For high temperature applications, it may be convenient to use an ester oil, e.g. a natural or synthetic ester oil. The insulator is preferably resistant to the fluid, i.e. is not dissolved by the fluid. Thus, the insulator should substantially not be able to be impregnated by the fluid, i.e. it should be substantially impregnable and/or impermeable to the fluid. Preferably, the insulating material and the fluid should not affect each other's properties, and should not react with each other.

In some embodiments, the composite material has a dielectric constant of less than 5 e.g. less than 4.2 at 60 Hz in accordance with ASTM D-150 or IEC 60250. Such a dielectric constant is suitable with e.g. an ester oil filled transformer.

In some embodiments, the composite material has a tensile strength of at least 60 MPa, such as at least 75 MPa, in accordance with ISO 527.

Such a high tensile strength is obtainable by means of the fibre reinforced composite of the present invention.

In some embodiments, the composite material has a compressive strength of at least 150 MPa, such as at least 200 MPa, in accordance with ISO 604. Such a high compressive strength is obtainable by means of the fibre reinforced composite of the present invention.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

The invention is now described, by way of example, with reference to the accompanying drawing, in which:

FIG. 1 is a section of an embodiment of an electrical transformer of the present invention.

DETAILED DESCRIPTION

The invention will now be described more fully hereinafter with reference to the accompanying drawing, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Paschen's Law is an equation that gives the breakdown voltage, i.e. the voltage necessary to start a discharge or electric arc between two electrodes in a gas as a function of pressure and gap length. Within the concept of present disclosure, the gap length is the smallest diameter of any pores/voids/channels within the composite material. The voltage needed to cause an arc reduces as the gap size is reduced, but only to a point. When the gap is reduced further, the voltage required to cause an arc rises again. The Paschen curve is described by following equation:

$$V = apd/(\ln(pd)+b)$$

Where V is the breakdown voltage in Volts, p is the pressure in Atmospheres or Bar, and d is the gap distance in meters. The constants a and b are specific constants for the composition of the gas. Thus, in embodiments of the present invention, any pores in the essentially non-porous composite material have a smallest diameter of less than the gap distance allowing breakdown in accordance with Paschen's law, depending on the pressure and gas in said pores, e.g. less than 1 micrometre. Typically, the pressure is atmospheric and the gas is air ($a=4.36\times10^7$V/(atm·m) and $b=12.8$).

FIG. 1 schematically illustrates an embodiment of an electrical transformer 100 which is at least partly oil-filled (schematically illustrated by the wavy oil-air interface indicated in the FIGURE). It is noted that the FIGURE is only schematic and provided to illustrate in particular some of the different kinds of insulators which may be used with the present invention.

Two neighbouring windings 101 (a & b) are shown, each comprising a coil of an electrical conductor 102 (a & b) around a core 103 (a & b), e.g. a metal core. The cores 103a and 103b are connected and fixed to each other by means of top and bottom yokes 104. This is thus one example set up of a transformer, but any other transformer set up can alternatively be used with the present invention, as is appreciated by a person skilled in the art.

The conductors 102 are insulated from each other and from other parts of the transformer 100 by means of the fluid which the transformer contains (e.g. an ester oil). However, also solid insulators are needed to structurally keep the conductors and other parts of the transformer immobile in their intended positions. Today, such solid phase insulators are typically made of cellulose based pressboard or Nomex™ impregnated by the insulating fluid. In contrast, according to the present invention, an essentially non-porous composite material comprising a resin matrix and insulating fibres surrounded by the resin matrix is used for forming the insulators. The insulators may e.g. be in the form of spacers 105 separating turns or discs of a winding 101 from each other, axial sticks 106 e.g. separating the conductor 105 winding 101 from its core 103 or from another winding 101, winding tables 107 separating the windings from other parts of the transformer 100 e.g. forming a support or table on which the windings, cores, yokes etc. rest, as well as insulating coating (not shown) of the conductor 102 forming the winding 101. In the FIGURE, only a few different example insulators are shown for clarity. For instance, a cylinder around a winding, between a winding and its core or between different windings (e.g. between high voltage and low voltage windings), made from the insulating composite material may be used in some embodiments. Such a cylinder may provide mechanical stability to windings when the conductor is e.g. wound over/onto the cylinder, and it may break the large oil gaps between two windings (e.g. low voltage and high voltage winding), which improves the overall insulation strength of the gap between the two windings. In some embodiments, concentric cylinders around the core may be used to separate and insulate different conductor layers of a winding from each other.

The spacers 105 are positioned between turns or discs of the conductor 103, separating the turns or discs from each other. It is advantageous to use a substantially rigid and non-porous material for spacers 105 in order to avoid that the spacers are compressed during manufacturing or use. It is a problem of cellulose pressboard that they both swell from taking up insulation fluid and are compressed over time, leading to change in height of winding which result in axial imbalance between the windings 101. The axial imbalance between two windings results into higher axial short circuit forces. Further, the spacers need to withstand the stress put on them. As an example, the composite material of the spacers has a tensile strength of at least 75 MPa (75 N/mm$^2$) or of at least 100 MPa (100 N/mm$^2$), a compressive strength of at least 200 MPa (200 N/mm$^2$) and a shrinkage of less than 0.5%. To achieve this a non-porous composite material of the present invention can be used.

The axial sticks 106 are positioned along the winding 101, e.g. between the conductor 102 of the winding and its core 103 or between two windings 101, insulating and spacing them from each other. Also winding sticks should be able to withstand stress in order to not break or be deformed. As an example, the composite material of the axial sticks has a tensile strength of at least 90 MPa (90 N/mm$^2$) or of at least 110 MPa (110 N/mm$^2$), and a flexural strength of at least 80 MPa (80 N/mm$^2$) or of at least 90 MPa (90 N/mm$^2$). To achieve this a non-porous composite material of the present invention can be used. Also, the axial sticks of the present invention are essentially moisture free (less than 0.5%) and prevent overloading.

The winding table 107 should be able to support the relatively heavy winding/core assembly. As an example, the composite material of the winding table has a tensile strength of at least 60 MPa (60 N/mm$^2$), and a flexural strength of at least 100 MPa (100 N/mm$^2$). To achieve this a non-porous composite material of the present invention can be used.

The composite material of the present invention may be produced in any of several standard ways. For instance, the fibres (especially when long fibres are used) may be mixed into/with the resin heated to liquid form, or resin 3o mixed with fibres (especially shorter fibres) may be compounded to granular form. Then, a heated (liquid) form of the resin-fibre mixture is formed to the desired shape of the composite material and allowed to cool and harden to solid form. For instance, the liquid mixture may be formed into e.g. spacers by means of injection moulding, or be formed into e.g. sticks by means of extrusion followed by cutting to desired length, or be formed into e.g. winding tables by means of compression moulding.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. An electrical transformer, comprising:
   an electrical insulator and a winding of an electrical conductor around a core, said insulator being an essentially non-porous composite material comprising a resin matrix and up to 60% by weight of synthetic insulating fibres surrounded by the resin matrix such that the insulator does not allow a liquid to penetrate into or through the insulator, the insulator having a maximum moisture content of less than 0.5% by weight at 23° C. and 50% relative humidity.

2. The transformer of claim 1, wherein the resin matrix is made from a synthetic thermoplastic compound chosen from the group consisting of polyethylene terephthalate (PET), polyphenylene sulphide (PPS), polyetherimide (PEI), polyethylene naphtalate (PEN), polybutylene terephthalate (PBT), polyphenylene ether (PPE) and polyethersulphone (PES), Polyether ether ketone (PEEK) and thermoset resins of epoxy or unsaturated polyester, and any mixture thereof.

3. The transformer of claim 1, wherein the insulator comprises between 50% and 60% by weight of the synthetic insulating fibres.

4. The transformer of claim 1, wherein the fibres are glass fibres, basalt fibres, aramid fibres, or any mixture thereof.

5. The transformer of claim 1, wherein the fibres have a number average length of less than 3 millimetres and the insulator is coated with a resin in the resin matrix.

6. The transformer of claim 1, wherein the insulator is in the form selected from the group consisting of a spacer between turns or discs of the winding, an axial stick outside or inside of the winding, a cylinder around a winding, between a winding and its core or between windings, a winding table positioned atop of or below the winding, a conductor insulation adhered to and surrounding the conductor, and combinations thereof.

7. The transformer of claim 1, wherein said electrical transformer is configured for an operating temperature of at least 105° C.

8. The transformer of claim 1, wherein said electrical transformer is fluid-filled.

9. The transformer of claim 8, wherein the fluid is an ester oil, and the composite material is resistant to the oil at a temperature which the transformer is configured to operate at.

10. The transformer of claim 1, wherein the composite material has a dielectric constant of less than 5 at 60 Hz.

11. The transformer of claim 1, wherein the composite material has a tensile strength of at least 60 MPa.

12. The transformer of claim 1, wherein the composite material has a compressive strength of at least 150 MPa.

13. The transformer of claim 1, wherein any pores in the essentially non-porous composite material have a diameter less than the gap distance allowing breakdown in accordance with Paschen's law.

14. The transformer of claim 1, wherein the fibres have a number average length of less than 1 mm.

15. The transformer of claim 1, wherein the fibres have a number average length of less than 0.2 mm.

16. The transformer of claim 1, wherein the composite material has a dielectric constant of less than 4.2 at 60 Hz.

17. The transformer of claim 1, wherein the composite material has a tensile strength of at least 75 MPa.

18. The transformer of claim 1, wherein the composite material has a compressive strength of at least 200 MPa.

19. A method of producing an electrical insulator for an electrical transformer, the method comprising: mixing a resin with up to 60% by weight of synthetic insulating fibres;
    processing the mixture into a suitable shape for the electrical insulator;
    allowing the shaped mixture to cool down and solidify to form the electrical insulator of an essentially non-porous composite material having a resin matrix and up to 60% by weight of the synthetic insulating fibres surrounded by the resin matrix such that the insulator does not allow a liquid to penetrate into or through the electrical insulator, the insulator having a maximum moisture content of less than 0.5% by weight at 23° C. and 50% relative humidity.

20. The method of claim 19, further comprising:
    positioning the electrical insulator in an electrical transformer.

* * * * *